US011653652B2

(12) United States Patent
Creasey et al.

(10) Patent No.: US 11,653,652 B2
(45) Date of Patent: May 23, 2023

(54) ANTIMICROBIAL COMPOSITIONS AND USES THEREOF

(71) Applicant: ITI Technologies, Inc., Leland, NC (US)

(72) Inventors: David H. Creasey, Leland, NC (US); Samuel Horace McCall, IV, Leland, NC (US)

(73) Assignee: ITI Technologies, Inc., Leland, NC (US)

( * ) Notice: Subject to any disclaimer, the term of this patent is extended or adjusted under 35 U.S.C. 154(b) by 0 days.

(21) Appl. No.: 17/685,803

(22) Filed: Mar. 3, 2022

(65) Prior Publication Data

US 2022/0248680 A1 Aug. 11, 2022

Related U.S. Application Data

(63) Continuation-in-part of application No. 17/363,593, filed on Jun. 30, 2021, now abandoned.

(60) Provisional application No. 63/046,194, filed on Jun. 30, 2020.

(51) Int. Cl.
| | | |
|---|---|---|
| *A01N 59/02* | (2006.01) | |
| *A01N 59/08* | (2006.01) | |
| *A01N 25/02* | (2006.01) | |

(52) U.S. Cl.
CPC ............. *A01N 59/02* (2013.01); *A01N 25/02* (2013.01); *A01N 59/08* (2013.01)

(58) Field of Classification Search
CPC ......... A01N 59/02; A01N 25/02; A01N 59/08
See application file for complete search history.

(56) References Cited

U.S. PATENT DOCUMENTS

| | | |
|---|---|---|
| 3,625,908 A | 12/1971 | Magin |
| 6,277,414 B1 | 8/2001 | Elhaik et al. |
| 2005/0191394 A1 | 9/2005 | Cummins et al. |
| 2008/0171117 A1* | 7/2008 | Mixon .................... A61L 2/235 134/41 |
| 2017/0347661 A1 | 12/2017 | Parsons |

OTHER PUBLICATIONS

International Search Report and Written Opinion dated Oct. 20, 2021 for counterpart International Application No. PCT/US2021/039842 (thirteen (13) pages).

* cited by examiner

*Primary Examiner* — Snigdha Maewall
(74) *Attorney, Agent, or Firm* — Steven A. Fontana; Maynard Nexsen, PC; E. Eric Mills

(57) ABSTRACT

The present invention provides antimicrobial compositions, typically aqueous compositions, for use in the inhibition and control of microorganisms, including without limitation, viruses, bacteria, fungi and yeast, on organic and inorganic surfaces. The present invention further provides methods of using such compositions for immediate and residual inhibition, including control, of such microorganisms for a period of up to 24 hours and beyond.

15 Claims, 6 Drawing Sheets

ANTIMICROBIAL COMPOSITIONS AND USES THEREOF

CROSS-REFERENCE TO RELATED APPLICATIONS

The presently disclosed subject matter is a Continuation in Part of U.S. application Ser. No. 17/363,593 filed Jun. 30, 2021, which is related and claims priority to U.S. Provisional Patent Application No. 63/046,194 entitled "Antimicrobial Compositions and Uses Thereof" filed on Jun. 30, 2020; the entire disclosures of which are incorporated herein by reference.

BACKGROUND

Mammalian pathogens, particularly human pathogens, are transmitted through a variety of mechanisms including, for example, transfer of bodily fluids, aerosol (coughing and sneezing), physical human contact and/or contact with surfaces on which the pathogen is viable. There are various agents that can treat surfaces for the immediate control/inhibition of microorganisms including, for example, bacteria, viruses and fungi. However, such agents, such as alcohol and bleach, only provide immediate inhibition of microorganisms allowing for immediate redeposition of such microorganisms. Accordingly, there is a need for one or more agents that provide long-term residual control of microorganisms, particularly pathogenic microorganisms that can be deposited on untreated surfaces and/or redeposited on previously treated surfaces.

As such, the present invention relates to antimicrobial compositions that are particularly useful for the inhibition of pathogenic microorganisms, particularly on surfaces of a variety of compositions and locations.

SUMMARY

One aspect of the present invention provides an antimicrobial composition.

Another aspect provides an antimicrobial composition comprising:
a solubility enhancing aqueous composition comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition;
a dilute sodium hydroxide solution having a concentration of about 0.036 percent to about 0.099 percent w/w of the antimicrobial composition;
an additive selected from the group consisting of an anionic surfactant and a non-ionic surfactant, such additive having a concentration from about 0.054 percent to about 0.066 percent w/w of the antimicrobial composition;
copper sulfate having a concentration from about 18 percent to about 26 percent w/w of the antimicrobial composition; and
water having a mass of at least 2.9 times the mass of the copper sulfate used in the antimicrobial composition.

An additional aspect of the present invention provides an antimicrobial composition comprising:
a solubility enhancing aqueous composition comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition;
a dilute sodium hydroxide solution having a concentration of about 0.036 percent to about 0.099 percent w/w of the antimicrobial composition;
an additive selected from the group consisting of an anionic surfactant and a non-ionic surfactant, such additive having a concentration from about 0.054 percent to about 0.066 percent w/w of the antimicrobial composition;
silver sulfate having a concentration from about 0.0198 percent to about 0.0242 percent w/w of the antimicrobial composition; and
water having a mass of at least 66.67 times the mass of the silver sulfate used in the antimicrobial composition.

A further aspect of the present invention provides an antimicrobial composition comprising:
ammonium sulfate having a concentration from about 0.0036 percent to about 0.0044 percent w/w of the antimicrobial composition;
sulfuric acid having a concentration from about 0.0315 percent to about 0.0385 percent w/w of the antimicrobial composition;
a dilute sodium hydroxide solution having a concentration of about 0.036 percent to about 0.099 percent w/w of the antimicrobial composition;
an additive selected from the group consisting of an anionic surfactant and a non-ionic surfactant, such additive having a concentration from about 0.054 percent to about 0.066 percent w/w of the antimicrobial composition;
copper sulfate having a concentration from about 18 percent to about 26 percent w/w of the antimicrobial composition; and
water having a mass of at least 2.9 times the mass of the copper sulfate used in the antimicrobial composition.

An addition aspect of the present invention provides an antimicrobial composition comprising:
ammonium sulfate having a concentration from about 0.0036 percent to about 0.0044 percent w/w of the antimicrobial composition;
sulfuric acid having a concentration from about 0.0315 percent to about 0.0385 percent w/w of the antimicrobial composition;
a dilute sodium hydroxide solution having a concentration of about 0.036 percent to about 0.099 percent w/w of the antimicrobial composition;

an additive selected from the group consisting of an anionic surfactant and a non-ionic surfactant, such additive having a concentration from about 0.054 percent to about 0.066 percent w/w of the antimicrobial composition;

silver sulfate having a concentration from about 0.0198 percent to about 0.0242 percent w/w of the antimicrobial composition; and water having a mass of at least 66.67 times the mass of the silver sulfate used in the antimicrobial composition.

The present invention also provides an antimicrobial composition comprising any amount of copper sulfate;

a solubility enhancing aqueous composition, typically comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition, wherein the amount of the solubility enhancing aqueous composition is in the range from about 0.004 to about 0.0052 times the mass of copper sulfate;

dilute sodium hydroxide, wherein the amount of the dilute sodium hydroxide is in the range from about 0.004 to about 0.0052 times the mass of copper sulfate;

an additive selected from the group consisting of an anionic surfactant and a non-ionic surfactant, wherein the amount of the additive is in the range from about 0.0028 to 0.0035 times the mass of copper sulfate; and water having a mass of at least 2.9 times the mass of the copper sulfate used in the antimicrobial composition.

Another aspect of the present invention provides an antimicrobial composition comprising any amount of silver sulfate;

a solubility enhancing aqueous composition, typically comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition, wherein the amount of the solubility enhancing aqueous composition is in the range from about 3.68 to 4.5 times the mass of silver sulfate;

dilute sodium hydroxide, wherein the amount of the dilute sodium hydroxide is in the range from about 3.645 to about 4.455 times the mass of silver sulfate;

an additive selected from the group consisting of an anionic surfactant and a non-ionic surfactant, wherein the amount of the additive is in the range from about 2.457 to 3.003 times the mass of silver sulfate; and water having a mass of at least 66.67 times the mass of the silver sulfate used in the antimicrobial composition.

Another aspect of the present invention further comprises the addition of an acid or base to adjust the pH of each antimicrobial composition set forth herein to a pH of greater than 3.0 and, more typically, a pH from about 4.0 to about 5.0 to an antimicrobial composition of the present invention. A most commonly used pH is 4.5.

Another aspect of the present invention provides an antimicrobial composition comprising:

a solubility enhancing aqueous composition comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition;

a dilute sodium hydroxide solution having a concentration of about 0.036 percent to about 0.099 percent w/w of the antimicrobial composition;

an additive selected from the group consisting of an anionic surfactant and a non-ionic surfactant, such additive having a concentration from about 0.054 percent to about 0.066 percent w/w of the antimicrobial composition;

silver sulfate having a concentration from about 0.00228 percent to about 0.00557 percent w/w of the antimicrobial composition; and water having a mass of at least 66.67 times the mass of the silver sulfate used in the antimicrobial composition.

The present invention further provides a method of inhibiting microorganisms comprising applying at least one antimicrobial composition of the present invention to such microorganisms and/or a material on which such microorganisms reside or could reside.

Also provided are antimicrobial surfaces comprising at least one surface to which at least one antimicrobial composition of the present invention has been applied.

An additional aspect of the present invention provides a method of preparing an antimicrobial surface comprising the application of at least one antimicrobial composition of the present invention to a respective surface.

Another aspect of the present invention provides a method of extending the shelf-life of perishable foodstuff comprising applying at least one antimicrobial composition of the present invention to at least one respective foodstuff. Such shelf-life can be extended for at least 24 hours, providing substantial value to providers of such perishable foodstuff. The present invention also includes the use of the present compositions on surfaces that explicitly exclude foodstuff.

BRIEF DESCRIPTION OF THE DRAWINGS

Features of the present invention will be more fully appreciated by reference to the following detailed description when taken in conjunction with the following drawings in which.

Figure 1:
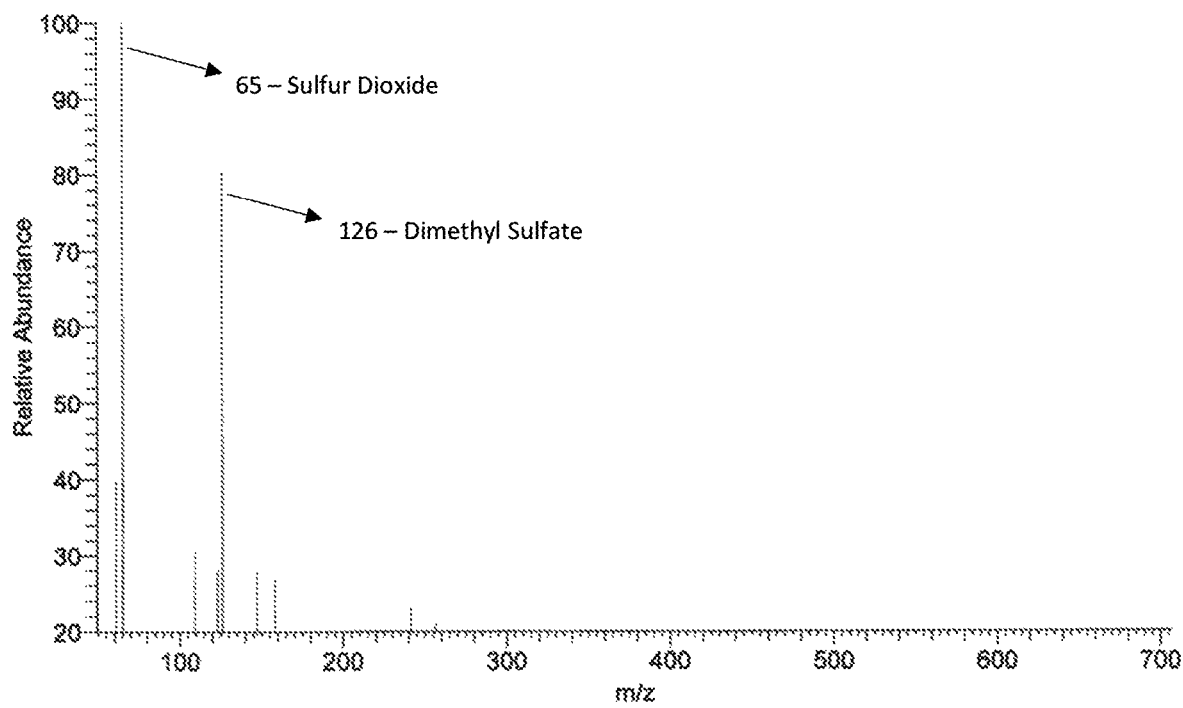
FIG. 1. depicts a low resolution spectrogram with 1 part reaction unit to 5 parts total.
Figure 2:
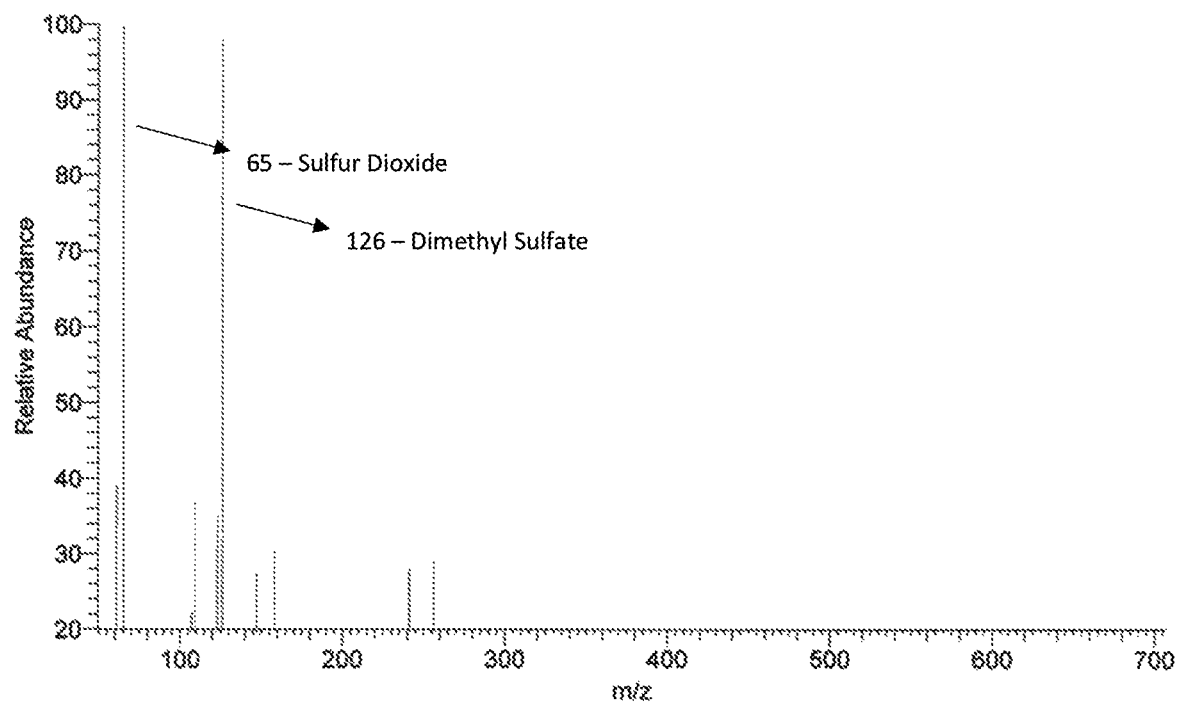
FIG. 2. depicts a high resolution spectrogram with 1 part reaction unit to 5 parts total.
Figure 3:
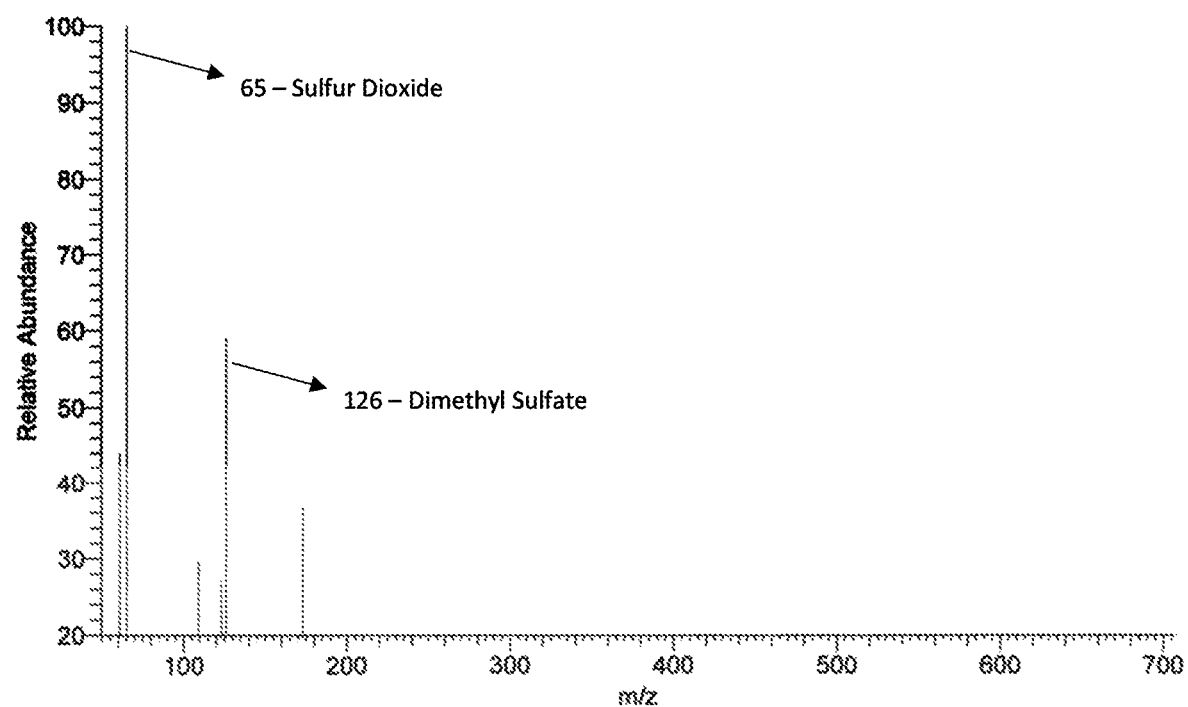
FIG. 3. depicts a low resolution spectrogram with 1 part reaction unit to 10 parts total.
Figure 4:
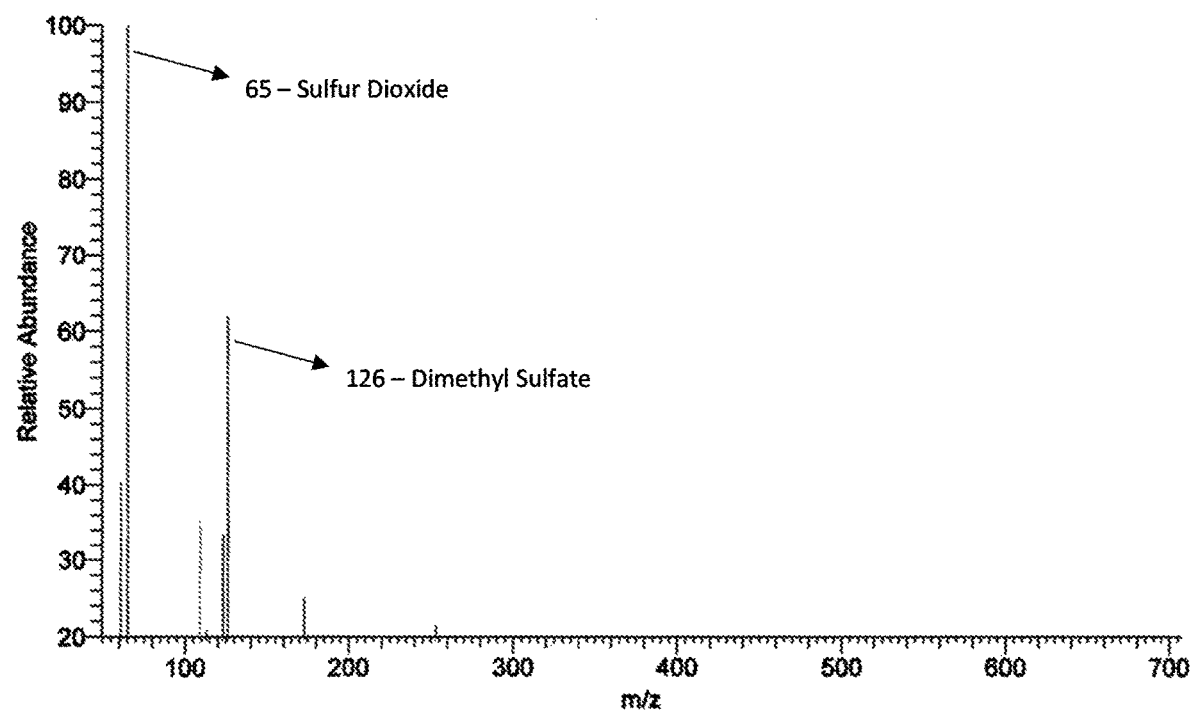
FIG. 4. depicts a high resolution spectrogram with 1 part reaction unit to 10 parts total.
Figure 5:
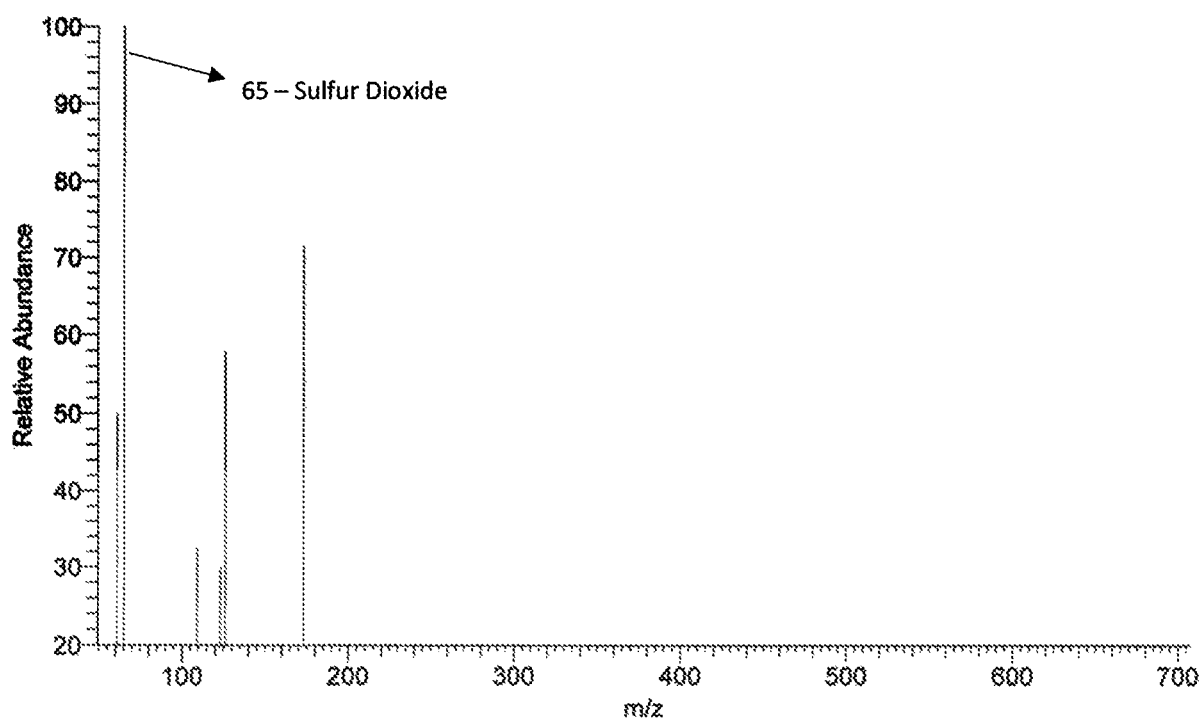
FIG. 5. depicts a low resolution spectrogram with 1 part reaction unit to 20 parts total.
Figure 6:
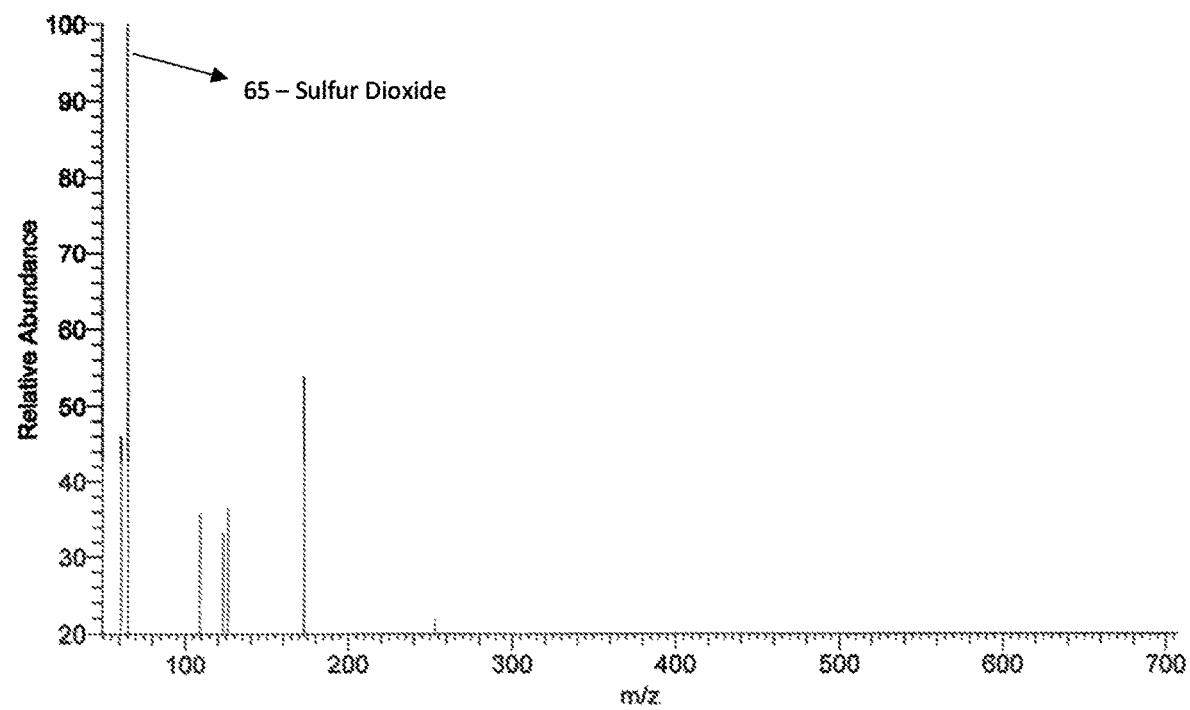
FIG. 6. depicts a high resolution spectrogram with 1 part reaction unit to 20 parts total.

Each of the spectrograms was run according to the respective teachings of Example 6. Each of the spectrograms depicts compositions that are free of salt crystals or other solids formed from the ammonium sulfate and sulfuric acid reactants.

While the aspects of the present disclosure are susceptible to various modifications and alternative forms, specific embodiments thereof are shown by way of example in the drawings and will herein be described in detail. It should be understood, however, that the drawings and detailed description are not intended to limit the disclosure to the particular forms illustrated but, on the contrary, the intention is to cover all modifications, equivalents and alternatives falling within the spirit and scope of the present disclosure as defined by the appended claims. The headings used herein are used for organizational purposes only and are not meant to limit the scope of the description. As used throughout this application, the word "may" is used in a permissive sense, meaning: "having the potential to"; rather than the mandatory sense meaning: "must". Similarly, the words "include", "including" and "includes" means including, without limitation. Additionally, as used in this specification and the appended claims, the singular forms "a", "an" and "the" include singular and plural referents unless the content clearly dictates otherwise.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combinations of features. In particular, with reference to the appended claims, features from dependent claims may be combined with those of independent claims and features from respective independent claims may be combined in any appropriate manner and not merely in the specific combinations enumerated in the appended claims.

DETAILED DESCRIPTION

Definitions

The term "antimicrobial" means antibacterial, anti-fungal, antiviral and anti-mold, each individually and collectively.

The term "dilute sodium hydroxide" means sodium hydroxide, typically but not limited to solid form, diluted with water to a concentration of not greater than about 20 percent.

The term "free of solids" means that the solubility enhancing aqueous composition do not form salt crystals or other solids that remain in the composition over time, such salt crystals or other solids being formed from the reactants of ammonium sulfate and sulfuric acid.

The term "inhibition" or "inhibiting" means the act of prophylaxis, retarding and/or controlling the growth of microbes in products as described herein.

The term "microbes" or "microorganisms" means, individually or collectively, bacteria, fungi, viruses, mold and/or yeast.

The term "reaction unit" relative to the preparation of a solubility enhancing aqueous composition means the desired total volume of a first solution as expressed as a ratio of a range of ammonium sulfate concentrations to sulfuric acid concentrations (the reactants).

The term "sodium hydroxide solution" means a sodium hydroxide, typically in a dilute sodium hydroxide solution, wherein the solution can be any dilution as further set forth herein.

The term "solubility enhancing aqueous composition" means at least one solubility enhancing aqueous compositions as described herein.

The term "sulfate anions" encompasses each of sulfate anions, bisulfate anions and combinations thereof. Combinations of sulfate anions and bisulfate anions are common in the solubility enhancing aqueous compositions described herein.

The term "sulfuric acid" means concentrated sulfuric acid having a concentration of from about 95% to about 98%.

The term "substantially free of solids" means that the antimicrobial compositions are at least 95 percent aqueous or, alternatively, at least 98 percent aqueous without the formation of salt crystals or other solids. The addition of materials not an element of the antimicrobial compositions in the preparation of compositions of the present invention may affect the amount of salts and/or other solids. As such, the term "substantially free of solids" pertains only to the preparations of antimicrobial compositions of the present invention described herein.

The term "surface" means any organic or inorganic, animate or inanimate surface. For clarity, a surface can include a mammalian, particularly human, surface (e.g., skin) or any inanimate surface including, for example and without limitation, plastic, upholstery, metal, fabric and the like of any composition and products made from such surfaces, dust and other particulates.

Description

The following description and examples are included to demonstrate the embodiments of the present disclosure. It should be appreciated by those of skill in the art that the compositions, techniques and methods disclosed in the examples herein function in the practice of the disclosed embodiments. However, those skilled in the respective arts should, in light of the present disclosure, appreciate that changes can be made to the specific embodiments and still obtain a like or similar result without departing from the spirit and scope of the disclosed embodiments.

The present specification includes references to "one aspect/embodiment" or "an aspect/embodiment". These phrases do not necessarily refer to the same embodiment although embodiments that include any combination of the features or elements disclosed herein are generally contemplated unless expressly disclaimed herein. Particular compositions, features, processes, elements or characteristics may be combined in any suitable manner consistent with this disclosure.

Globally, microorganisms are responsible for millions of human deaths annually. For example, influenza viruses, generally of the family Orthomyxoviridae are responsible for an average, annual global mortality of over 659 thousand death. Additional viruses contributing to human mortality include, for example and without limitation, respiratory viruses (e.g., rhinoviruses/respiratory syncytial viruses (RSV), human parainfluenza viruses (HPIV), respiratory adenoviruses and human coronaviruses (e.g., types 229E, NL63, OC 43, HKU1, MERS-CoV, SARS—CoV, SARS—COVID-19) and the like. Of these, the trans-infection rate of MERS is low but mortality is over 37% of those infected, while COVID-19 infection rate is high, as is the recovery rate, but is responsible for about 3.81 million deaths as of June of 2021. Intestinal viruses such as rotaviruses can also be detrimental to health and life, particularly infants.

Similarly, bacterial infections are extremely prevalent with particular and continued growing concern for antibiotic-resistant bacteria such as *Klebisiella pneumoniae, Escherichia coli* and Methicillin-resistant *Staphylococcus aureus* (MRSA). Antibiotic-resistant bacteria, alone, have been determined to be responsible for an estimated 700 thousand deaths annually, including an estimated 50,000 deaths in the United States and Europe.

Fungi also contribute to mammalian, particularly human morbidity (e.g., tinea including, for example and without limitation, ringworm and athlete's foot) and mortality (e.g., *Candida auris,* responsible for between 1.5 and 2.0 million global deaths annually).

The lists above are presented only for exemplification and are not meant to be limiting to more comprehensive lists of pathogenic microorganism known to cause mammalian morbidity and mortality.

The vast majority of pathogenic microorganisms survive on a variety of surfaces and can be transferred to humans via simple contact, frequently via hands/fingers which are responsible for inoculating the respective organism(s) via touching, for example, mouth, nose and/or eyes. Such surfaces exist, for example, in homes, offices, medical facilities, public and private means of transportation, other dry surfaces, wet surfaces (e.g., moist environments and biofilms including, for example, commodes, sinks, cooling towers and medical equipment such as ventilators), dust, decaying debris and any location where pathogenic microorganisms can rest. Importantly, some such microorganisms can survive on surfaces for days, weeks and, sometime, months.

Bleach and certain concentrations of alcohols have the ability to kill a high percentage of microorganisms on contact but lack any significant residual effect. Accordingly, such microorganisms can be redeposited on treated surfaces and remain viable for a considerable amount of time, increasing the incidence of transmission and infection. The cost of redeposition of microorganisms en masse is virtually impossible to calculate because the cost is to individuals infected, cost of treatment, the cost to organizations in attempts to control such redeposition and related business, familial and community costs. For example, the annual cost to individuals infected by MRSA in United States hospitals alone is estimated to infect approximately 88,000 patients resulting in about 11,000 deaths. Costs of treating these individuals is about $60,000 U.S. per patient and up to $9.7 billion U.S. annually. The broader cost of hospitals attempting to treat surfaces to reduce the incidence of MRSA is estimated to be about $4.2 billion U.S. annually.

Similarly, COVID-19 is recognized to be transmitted, among other means, via human touch to infected surfaces. Although surface transmission is not the primary method of pathogen transmission, the cost of retreatment and the cost to commerce via shut-downs and operational restrictions, particularly because there has been no effective residual surface treatment against COVID-19, has been incalculable to date.

To address the need for a residual antimicrobial composition, also having knock-down capabilities, the present invention provides antimicrobial compositions. As used herein, the term "knock-down" means the inhibition of microorganisms existing on surfaces at the time an antimicrobial agent is applied to a target surface but does not include residual inhibition of microorganisms unless otherwise specified as in the residual effect provided by antimicrobial compositions of the present invention.

The present invention further provides a method of inhibiting microorganisms comprising applying at least one antimicrobial composition of the present invention to such microorganisms and/or a surface on which such microorganisms reside or could reside. Such microorganisms can be one or more of any microorganism, regardless of form and can include, for example and without limitation, pathogenic microorganism and non-pathogenic microorganisms with pathogenic microorganisms having a greater need for inhibition and, more particularly, include drug-resistant pathogenic organisms and/or difficult to control resultant diseases in mammals, including humans. Such microorganisms include, for example and without limitation, *Klebisiella pneumoniae, Escherichia coli,* Methicillin-resistant *Staphylococcus aureus* (MRSA), *Candida auris,* MERS and coronavirus COVID-19.

Also provided are antimicrobial surfaces comprising at least one surface to which at least one antimicrobial composition of the present invention has been applied.

An additional aspect of the present invention provides a method of preparing an antimicrobial surface comprising the application of at least one antimicrobial composition of the present invention to a respective surface.

Applications of compositions of the present invention provide knock-down of target microbes wherein the knock-down activity inhibits the target or present microbes. However, inhibition of microbes on surfaces using the present antimicrobial compositions may not provide instant (within seconds) inhibition of some microbes, but typically provide such knock-down of microorganisms in less than about ten minutes. As such, another knock-down agent such as, for example, bleach or at least 60% alcohol, may be first used on a surface for accelerated knock-down of microorganisms followed by an application of the present invention for residual control. The present compositions may be combined with some knock-down antimicrobial agents, but the chemical composition of such other knock-down agents may react with the elements of the present composition, negatively affecting the anti-microbiological activity of the present compositions. It is likely best, when rapid knock-down/inhibition of microorganisms on a surface are desired, to apply the knock-down agents to the target surface, permit time for such agents to dry on the respective surface, then apply a composition of the present invention for residual control.

Residual inhibition of microorganisms on surfaces provided by compositions of the present invention may vary depending upon concentration used and whether the surface is disturbed by other cleaners or liquids. For example and without limitation, the present compositions can provide residual inhibition of microorganisms for more than one hour and, more particularly, such residual inhibition can last for at least 1 hour, 2 hours, 3 hours, 4 hours, 5 hours, 6 hours, 7 hours, 8 hours, 9 hours 10 hours, 11 hours and more than 12 hours, or any fractional amount of time within the stated range. Moreover, the present antimicrobial compositions may provide residual antimicrobial for at least 24 hours or greater. Reapplication of an antimicrobial composition of the present invention will provide additional knock-down and residual inhibition of microorganisms.

Application of at least one composition of the present invention to surfaces can be via any method that provides effective coverage and distribution of such compositions. Typically, applications that provide complete coverage of the target while minimizing the percentage of fine particles that can drift away from the target is best. However, when undersides and side surfaces need to be treated, there is a balance between the percentage of fine particles and effective coverage. As such, without limitation, pump sprayers, powered sprayers, electrostatic sprayers, airless sprayers, foggers and the like, (collectively, "applicators") are acceptable for applying compositions of present invention to surfaces. Such applicators can be handheld, hand carried, backpack, semi-stationary and large volume stationary or wheeled sprayers as the circumstance dictates. The type of sprayer should be left to the discretion of the individual(s) applying the present compositions depending upon the target surface(s), accessibility of the target surface, location of the target surface and other practical and environmental conditions under which the present compositions are applied.

Antimicrobial compositions of the present invention can be applied to surfaces in a concentrated form. Carriers can be any liquid that would not deleteriously react with the present compositions. It is more economical, however, to apply compositions of the present invention in a more dilute form. Typically, water, frequently deionized water, is an acceptable carrier for providing dilute mixtures of the present compositions.

Typically, for antimicrobial activity, in compositions of the present invention including copper sulfate, copper sulfate is used at a concentration of at least about 2,500 ppm of the total liquid mixture being applied to a target surface. More particularly, concentrations of copper sulfate in compositions of the present invention can include about 2,500 ppm, 3,500 ppm, about 4,500 ppm, about 5,500 ppm, about 6,500 ppm, about 7,500 or greater than about 8,000 ppm of the total liquid being applied to a surface. Moreover, any whole or fractional number of ppm of the stated range of such antimicrobial composition may be used. For antiviral inhibition, including residual antiviral inhibition, concentrations of at least one composition of the present invention of at least 4,500 ppm of the total liquid being applied, although less or more may be used depending upon the type of virus being targeted.

For antimicrobial activity, in compositions of the present invention including silver sulfate, silver sulfate is used at a concentration of at least about 15 ppm of the total liquid mixture being applied to a target surface. More particularly, concentrations of silver sulfate in compositions of the present invention can range from at least 15 ppm to about 3,000 ppm wherein any whole or fractional number of ppm of the stated range of such antimicrobial composition may be used. Inhibition of COIVID-19 can be achieved on a surface using a silver sulfate concentrate of about 1,100 ppm or greater.

Another aspect of the present invention provides a method of extending the shelf-life of perishable foodstuff comprising applying at least one antimicrobial composition of the present invention to at least one respective foodstuff. Such shelf-life can be extended for at least 24 hours, providing substantial value to providers of such perishable foodstuff.

For each of the claims set forth herein below, such claims can be alternatively drafted using "consisting of" and "consisting essentially of" claim language.

For the methods of inhibiting microorganisms as referenced herein, the present invention provides the following compositions:

One aspect of the present invention provides an antimicrobial composition comprising:

a solubility enhancing aqueous composition comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition;

a dilute sodium hydroxide solution having a concentration of about 0.036 percent to about 0.099 percent w/w of the antimicrobial composition;

an additive selected from the group consisting of an anionic surfactant and a non-ionic surfactant, such additive having a concentration from about 0.054 percent to about 0.066 percent w/w of the antimicrobial composition;

copper sulfate having a concentration from about 18 percent to about 26 percent w/w of the antimicrobial composition; and water having a mass of at least 2.9 times the mass of the copper sulfate used in the antimicrobial composition.

An additional aspect of the present invention provides an antimicrobial composition comprising:

a solubility enhancing aqueous composition comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition;

a dilute sodium hydroxide solution having a concentration of about 0.036 percent to about 0.099 percent w/w of the antimicrobial composition;

an additive selected from the group consisting of an anionic surfactant and a non-ionic surfactant, such additive having a concentration from about 0.054 percent to about 0.066 percent w/w of the antimicrobial composition;

silver sulfate having a concentration from about 0.0198 percent to about 0.0242 percent w/w of the antimicrobial composition; and water having a mass of at least 66.67 times the mass of the silver sulfate used in the antimicrobial composition.

A further aspect of the present invention provides an antimicrobial composition comprising:
ammonium sulfate having a concentration from about 0.0036 percent to about 0.0044 percent w/w of the antimicrobial composition;
sulfuric acid having a concentration from about 0.0315 percent to about 0.0385 percent w/w of the antimicrobial composition;
a dilute sodium hydroxide solution having a concentration of about 0.036 percent to about 0.099 percent w/w of the antimicrobial composition;
an additive selected from the group consisting of an anionic surfactant and a non-ionic surfactant, such additive having a concentration from about 0.054 percent to about 0.066 percent w/w of the antimicrobial composition;
copper sulfate having a concentration from about 18 percent to about 26 percent w/w of the antimicrobial composition; and
water having a mass of at least 2.9 times the mass of the copper sulfate used in the antimicrobial composition.

An addition aspect of the present invention provides an antimicrobial composition comprising:
ammonium sulfate having a concentration from about 0.0036 percent to about 0.0044 percent w/w of the antimicrobial composition;
sulfuric acid having a concentration from about 0.0315 percent to about 0.0385 percent w/w of the antimicrobial composition;
a dilute sodium hydroxide solution having a concentration of about 0.036 percent to about 0.099 percent w/w of the antimicrobial composition;
an additive selected from the group consisting of an anionic surfactant and a non-ionic surfactant, such additive having a concentration from about 0.054 percent to about 0.066 percent w/w of the antimicrobial composition;
silver sulfate having a concentration from about 0.0198 percent to about 0.0242 percent w/w of the antimicrobial composition; and
water having a mass of at least 66.67 times the mass of the silver sulfate used in the antimicrobial composition.

The present invention also provides an antimicrobial composition comprising
any amount of copper sulfate;
a solubility enhancing aqueous composition, typically comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition, wherein the amount of the solubility enhancing aqueous composition is in the range from about 0.004 to about 0.0052 times the mass of copper sulfate;
dilute sodium hydroxide, wherein the amount of the dilute sodium hydroxide is in the range from about 0.004 to about 0.0052 times the mass of copper sulfate;
an additive selected from the group consisting of an anionic surfactant and a non-ionic surfactant, wherein the amount of the additive is in the range from about 0.0028 to 0.0035 times the mass of copper sulfate; and
water having a mass of at least 2.9 times the mass of the copper sulfate used in the antimicrobial composition.

Another aspect of the present invention provides an antimicrobial composition comprising
any amount of silver sulfate;
a solubility enhancing aqueous composition, typically comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition, wherein the amount of the solubility enhancing aqueous composition is in the range from about 3.68 to 4.5 times the mass of silver sulfate;
dilute sodium hydroxide, wherein the amount of the dilute sodium hydroxide is in the range from about 3.645 to about 4.455 times the mass of silver sulfate;
an additive selected from the group consisting of an anionic surfactant and a non-ionic surfactant, wherein the amount of the additive is in the range from about 2.457 to 3.003 times the mass of silver sulfate; and
water having a mass of at least 66.67 times the mass of the silver sulfate used in the antimicrobial composition.

When the phrase "any amount of copper sulfate" or "any amount of silver sulfate" is used herein, it is meant that any reasonable amount of either copper sulfate or silver sulfate can be used in the present compositions. For example, and without limitation, the amount of copper sulfate or silver sulfate used in the present compositions can be in the range from about 1 gram to multiple kilos (e.g. 1,000 Kg). In other words, the total volume of a composition of the present invention is limited only by the available preparation equipment, the ability of a manufacturing facility to accommodate such volumes and the ability of personnel to carry out preparation of an antimicrobial composition of the present invention.

Another aspect of the present invention further comprises the addition of an acid or base to adjust the pH of each antimicrobial composition set forth herein to a pH of greater than 3.0 and, more typically, a pH from about 4.0 to about 5.0 to an antimicrobial composition of the present invention. A most commonly used pH is 4.5.

A further aspect of the present invention provides for an antimicrobial composition comprising:
a solubility enhancing aqueous composition comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition;

a dilute sodium hydroxide solution having a concentration of about 0.036 percent to about 0.099 percent w/w of the antimicrobial composition;

an additive selected from the group consisting of an anionic surfactant and a non-ionic surfactant, such additive having a concentration from about 0.054 percent to about 0.066 percent w/w of the antimicrobial composition;

silver sulfate having a concentration from about 0.00228 percent to about 0.00557 percent w/w of the antimicrobial composition; and water having a mass of at least 66.67 times the mass of the silver sulfate used in the antimicrobial composition. This composition can also be pH adjusted as set forth herein, and Glucopon 420 is a commonly used non-ionic surfactant. This iteration of the present compositions is particularly important for commercial use because formulations of the present invention using silver sulfate at concentrations greater than about 0.00557 turned surfaces the color black, resulting in a commercially unacceptable antimicrobial composition. The resulting black color was sufficiently intense and steadfast that the black color could not typically be removed with traditional cleaning fluids and cleaning methods. The inventors dedicated substantial research and development time and effort to develop a composition containing silver sulfate that maintained substantial and required antimicrobial activity while not turning targeted surfaces black.

Moreover, any art that demonstrates the use of copper sulfate as an antimicrobial cannot be used as prior art against silver sulfate by mere suggestion that copper and silver, particularly in the sulfate or elemental form, are interchangeable. Silver and copper ions are not interchangeable. While silver and copper occupy the same periodic group, silver is less reactive than copper because its filled 4d shell is not very effective in shielding the electrostatic forces of attraction from the nucleus to the outermost 5s electron, and hence silver is near the bottom of the electrochemical series. In group 11, silver has the lowest first ionization energy (showing the instability of the 5s orbital), but has higher second and third ionization energies than copper (showing the stability of the 4d orbitals), so that the chemistry of silver is predominantly that of the +1 oxidation state, reflecting the increasingly limited range of oxidation states along the transition series as the d-orbitals fill and stabilize. Unlike copper, for which the larger hydration energy of $Cu^{2+}$ as compared to $Cu^+$ is the reason why the former is the more stable in aqueous solution and solids despite lacking the stable filled d-subshell of the latter, with silver this effect is swamped by its larger second ionization energy. Hence, $Ag^+$ is the stable species in aqueous solution and solids, with $Ag^{2+}$ being much less stable as it oxidizes water. Additionally, silver has a higher standard electrode potential at 0.7996 vs copper at 0.520. As such, the present compositions were designed and formulated by recognizing the chemical differences between copper and silver, and copper sulfate and silver sulfate, and keeping the silver metal ions soluble to provide optimal antimicrobial activity, particularly at lower concentrations of silver sulfate having a concentration from about 0.00228 percent to about 0.00557 percent w/w of the respective antimicrobial composition, while avoiding the negative aspect of turning surfaces to which such compositions are applied from not turning black. In other words, the compositions having lower concentrations of silver sulfate can be applied to surfaces and provide effective antimicrobial activity while not altering the color of targeted surfaces.

As reference in the antimicrobial compositional aspects of the present invention, the amount of water in a respective composition can vary by the amount of copper sulfate or silver sulfate used in such composition. To provide optimal coverage of the antimicrobial compositions to target areas for antimicrobial inhibition and efficacy, the intent is to provide compositions that are essentially free or free of solids. This is accomplished by providing sufficient water to optimally solubilize the copper sulfate or silver sulfate, respectively, depending upon the composition selected for use. Because there are ranges for the amount of either copper sulfate or silver sulfate permitted in the present compositions, the amount of water must be adjusted to ensure solubilization of either the copper sulfate or silver sulfate as set forth herein. With this amount of water, each of the elements in any given composition of the present invention will also be solubilized to the extent such element requires further solubilization.

For example, and without limitation, if 10 grams of silver is desired, a quantity of water with a mass of at least 666.7 grams must be added. If 10 grams of copper is desired, a quantity of water with mass of at least 29 grams must be added.

The present antimicrobial compositions can be prepared via multiple pathways. Preparation can be accomplished by first preparing a solubility enhancing composition as described below, and then adding the additional elements within the concentration ranges taught herein. Alternatively, an antimicrobial composition of the present invention can be prepared by adding each element directly to the selected amount of water, to ensue solubility of either copper sulfate or silver sulfate, as selected, providing a dilute ammonium sulfate solution is first prepared as referenced below.

A solubility enhancing aqueous composition comprising a solution comprises an anionic component consisting essentially of sulfate ions, alone or in combination with bisulfate ions, having a concentration from about 8.00 moles per liter to about 13.00 moles per liter of the solubility enhancing aqueous composition, and a cationic component consisting essentially of ammonium ions having a concentration from about 1.45 moles per liter to about 2.01 moles per liter of the solubility enhancing aqueous composition. Generally, the solubility enhancing aqueous composition will also comprise hydrogen ions in a concentration from about 17.38 to about 21.68 moles per liter of the total volume of the solubility enhancing aqueous composition.

It is the intent of the present disclosure to permit the skilled artisan to prepare a solubility enhancing aqueous composition element using a range of water in a ratio to the concentrations of ammonium sulfate and sulfuric acid for each preparation, with the resultant sulfate anions and ammonium cations, and the amount of water to be determined by such artisan, each within the parameters taught herein.

For the sake of clarity, two solutions are formed in preparing a solubility enhancing aqueous composition: 1) an ammonium sulfate stock solution; and 2) the ammonium sulfate stock solution in sulfuric acid, and water, as desired.

To prepare a solubility enhancing aqueous composition, an ammonium sulfate stock solution is first prepared. For example, and without limitation, an ammonium sulfate stock solution is prepared to contain 20%, 24%, 30%, 40%, 50% or 60% of ammonium sulfate in water, typically, without restriction, deionized water. For the sake of clarity, the percent concentration of ammonium sulfate can be any whole number or fraction thereof in a range from about 20% to about 60%. The molar concentration of the stock solution varies by the ammonium sulfate concentration in a known volume of water.

By means of exemplification, the following calculations are used to determine the amount of ammonium sulfate and sulfuric acid to add to form a solubility enhancing aqueous composition.

Ammonium Sulfate:

Ammonium sulfate equals 132.14 grams per mole. Using, for example, a 24% ammonium sulfate solution, such solution would have 240 grams of ammonium sulfate per 1 L of water. Because the ratio of ammonium sulfate to sulfuric acid in this exemplification is about 48% ammonium sulfate to about 52% sulfuric acid, the first solution would contain 115.20 grams of ammonium sulfate, equaling 0.872 moles per liter. As such, one mole of ammonium sulfate provides 2 moles of ammonium and 1 mole of sulfate. Accordingly, 0.872 moles of ammonium sulfate provide to the ammonium sulfate stock solution 1.744 moles of ammonium and 0.872 moles of sulfate required per liter of reaction in forming a solubility enhancing aqueous composition.

Sulfuric Acid (Concentrated):

Sulfuric acid equals 98.079 g/mole as concentrated (95% to 98%) reagent grade sulfuric acid. Sulfuric acid exists as a liquid and has a density of 1.840 g/mL. For this example, sulfuric acid comprises 52% of a solubility enhancing aqueous composition of 1 liter. As such, 520 mL (0.52 L) of sulfuric acid is added to the ammonium sulfate stock solution. 520 mL times 1.840 g/mL equals 956.8 grams. 956.8 grams divided by 98.079 grams per mole provides the target concentration of 9.755 moles of sulfuric acid per liter of preparation. 9.755 moles of sulfuric acid provides 9.755 moles of sulfate anion and 2 moles of hydrogen resulting from each mole of acid, in this example, 19.51 moles of hydrogen per liter of said first solution.

Reaction Unit:

Using the values set forth above, in this instance, there are about 0.872 moles of ammonium sulfate to about 9.755 moles of sulfuric acid providing:

about 0.872 moles of ammonium sulfate provides about 0.872 moles of sulfate and about 1.744 moles of ammonium required per reaction unit liter; and about 9.755 moles per liter of sulfuric acid provides about 9.755 moles of sulfate anion and about 19.51 moles of hydrogen per liter of reaction unit.

Using this example, each reaction unit, forming a solubility enhancing aqueous composition, would contain:

about 0.972 moles of sulfate (from ammonium sulfate) plus about 9.755 moles of sulfate from ammonium sulfate equaling about 10.627 moles of sulfate anion per liter comprising sulfate anions alone, bisulfate anions alone or, typically, a mixture of sulfate and bisulfate anions;

about 1.744 moles of ammonium per liter; and about 19.51 moles of hydrogen per liter.

Once the molar concentration of ammonium, sulfate and hydrogen is established, the desired molar concentration can be prepared by the ordinarily skilled artisan using any volume of water in preparation of a solubility enhancing aqueous composition. It is important, regardless of the actual method of preparing a solubility enhancing aqueous composition, that sufficient water is used to inhibit and eliminate the formation of salts that may fall out of solution.

To achieve solubility enhancement, ranges of concentration of sulfate ions and ammonium ions in the solubility enhancing aqueous compositions are used while maintaining solubility enhancing aqueous compositions that are essentially free or are free of salt crystals or other solids from the reactants that form a solubility enhancing aqueous composition. Accordingly, a solubility enhancing aqueous composition comprises an anionic component consisting essentially of sulfate ions, alone or in combination with bisulfate ions, has a concentration range from about 8.00 moles per liter to about 13.00 moles per liter of the first solution volume. The solubility enhancing aqueous composition also comprises a cationic component consisting essentially of ammonium ions has a concentration from about 1.45 moles per liter to about 2.01 moles per liter of the first solution volume. Typically, when the lower values within the range for sulfate ions are selected for preparing a solubility enhancing aqueous composition, a lower value within the stated range for ammonium ions is selected and included in the preparation of the solubility enhancing aqueous composition. Similarly, when higher values within the stated range for sulfate ions are selected, higher values of ammonium ions are selected for the preparation of a solubility enhancing aqueous composition. Although not imperative, typically, the sulfate ion concentration within the given range of from about 8.00 moles per liter to about 13.00 moles per liter is proportionally commensurate with the range of ammonium ion concentration within the given the given range of from about 1.45 moles per liter to about 2.01 moles per liter of the solubility enhancing aqueous composition volume. When prepared according to the solubility enhancing aqueous composition embodiments provided herein, the resulting hydrogen ion concentration will typically fall within the range from about 17.38 moles per liter to about 21.68 moles per liter of first solution volume but falling within this hydrogen range is not necessarily critical for the preparation of a solubility enhancing aqueous composition, but is beneficial when using the solubility enhancing aqueous compositions for enhancing solubility of compounds or other materials depending upon the nature thereof.

The process for preparing the solubility enhancing aqueous compositions can be carried out using traditional laboratory and safety equipment when using concentrated acid and water that could generate significant heat. Within these considerations, the selection of laboratory equipment is not critical to the formation of the solubility enhancing aqueous compositions. More particularly, the preparation of the solubility enhancing aqueous compositions wherein the ammonium sulfate stock solution is combined with sulfuric acid requires laboratory apparatuses that are approved for heat generation, splashing and, potentially, pressure relief. Accordingly, the solubility enhancing aqueous compositions should be prepared in a laboratory vessel that is not sealed providing for pressure relief, rather than a potential hazardous situation with pressure build up in an unrated vessel. The ordinarily skilled artisan should be knowledgeable in the selection and use of such apparatuses.

For commercial-scale production of solubility enhancing aqueous compositions, the ordinarily skilled artisan will recognize that the reaction between the solubilized ammonium sulfate and sulfuric acid is typically exothermic. As such, a reaction vessel appropriate to safely contain and, typically, cool this reaction, is recommended. Commercial production of a solubility enhancing aqueous composition can be accomplished using any of the teachings herein but on a larger scale than the laboratory scale teachings and examples disclosed herein. Moreover, such commercial production can be accomplished, without limitation, as taught herein or with equipment known to the ordinarily skilled artisan.

The order of adding the reactants to each other is not critical in the preparation of a solubility enhancing aqueous composition. Either the stock ammonium sulfate solution can be added to the sulfuric acid or, more typically, sulfuric acid is added to the stock ammonium sulfate solution to avoid the splattering typical of adding a solution containing water to acid. Typically, the heat generating reaction forming a solubility enhancing aqueous composition is permitted to run to conclusion, with the term "conclusion" having the meaning understood by the ordinarily skilled artisan. For the sake of clarity, conclusion of the reaction between the ammonium sulfate stock solution and sulfuric acid typically occurs when the reactants no longer produce an exothermic reaction and the temperature of the solution begins to decrease to ambient temperature. Alternatively, an antimicrobial composition of the present invention can be prepared directly, without first forming a solubility enhancing aqueous composition by adding the appropriate amount of prepared ammonium sulfate solution and sulfuric acid to water, consistent with appropriate safety protocols for adding acid to water while being mindful of the potential heat and pressure ramifications.

Using either method to introduce the ammonium sulfate and sulfuric acid to an antimicrobial composition, ammonium sulfate has a concentration from about 0.0036 percent to about 0.0044 percent w/w of the antimicrobial composition, and sulfuric acid has a concentration from about 0.0315 percent to about 0.0385 percent w/w of the antimicrobial composition.

In addition to using a solubility enhancing aqueous composition or directly preparing an antimicrobial composition of the present invention by direct addition of the ammonium sulfate and sulfuric acid, the following elements are added to prepare an antimicrobial composition of the present invention.

For the preparation of the above-referenced aqueous antimicrobial compositions, a 20 percent to 50 percent dilute sodium hydroxide solution is either prepared using techniques well known to the skilled artisan or purchased. The range of sodium hydroxide concentration in the present aqueous antimicrobial compositions is based on varied concentrations of sodium hydroxide. When higher concentration sodium hydroxide solutions are used, one would typically use the lower concentration range of 0.036% w/w of the total aqueous element volume of the composition. Conversely, when lower concentration sodium hydroxide solutions are used, one would typically use the higher concentration range of about 0.099% w/w of the total aqueous element volume of the composition. Total aqueous element volume composition means the sum volume of the aqueous components of the present composition including the solubility enhancing aqueous composition (or ammonium sulfate solution when used with sulfuric acid in lieu of the use of a solubility enhancing aqueous composition), the sodium hydroxide solution, surfactant and water.

Various aqueous concentrations of non-ionic and anionic surfactants are commercially available, frequently found in concentrations of about 20% to about 80% in water. Such surfactants can also be prepared by diluting concentrated non-ionic surfactant and/or anionic surfactants in water to desired concentrations. Accordingly, such surfactants having a concentration of 20%, 30%, 40%, 50%, 60%, 70% and 80% are useful in the present composition. Generally, surfactant concentrations of at least 20% in water are useful.

More particularly, a 50% concentration of Glucopon® 420 in water (available from multiple vendors including, for example, BASF Corp., Florham Park, N.J., USA; INCI name: caprylyl glucoside (and) myristyl glucoside as known to the ordinary skilled artisan) is useful as a nonionic surfactant in the present aqueous antimicrobial compositions. When higher concentration surfactant solutions are used, one would typically use the lower concentration range of about 0.054% w/w of the total aqueous element volume of the composition. Conversely, when lower concentration surfactant solutions are used, one would typically use the higher concentration range of about 0.066% w/w of the total aqueous element volume of the composition.

The surfactant element of the present composition can be added to this aqueous solution or can optionally be added following the addition of the copper sulfate or silver sulfate element.

However, the calculation for the concentration of the surfactant is based on the total aqueous element volume of the antimicrobial composition as if the copper and/or silver sulfate had not yet been added. The at least one surfactant is selected from the group consisting of non-ionic surfactant and anionic surfactant having a concentration from about 0.054 percent to about 0.066 percent w/w of the total aqueous element volume of the composition.

The copper or silver sulfate element of the present aqueous antimicrobial composition is added to the aqueous solution described above at different concentration. Copper sulfate concentration is from about 18 percent to about 26 percent weight/weight of the total volume of an antimicrobial composition of the present invention. Silver sulfate concentration is from about 0.0198 percent to about 0.0242 percent weight/weight of the total volume of an antimicrobial composition of the present invention composition. As referenced herein, the amount of copper sulfate or silver sulfate mass will be the base reference for determining the minimum mass amount of water to be used in a respective antimicrobial composition.

Once an antimicrobial composition is prepared, the final pH should be adjusted to a pH of greater than 3.0 and, more typically, a pH from about 4.0 to about 5.0 with a pH of about 4.5 being more typically used. Any base or acid can be used to increase or decrease, respectively, the pH of such a composition. However, it is best to utilize acids and bases already used in the present compositions; dilute sodium hydroxide to increase the pH and sulfuric acid to decrease the pH. Alternatively, pH is controlled throughout the various steps of preparation of an antimicrobial composition of the present invention. For example, pH can be adjusted to the ranges set forth above following the addition of, for example, dilute sodium hydroxide to a partially prepared composition, and then again following the addition of copper sulfate or silver sulfate and, optionally, following the addition of copper sulfate or silver sulfate and the anionic and/or nonionic surfactant. As such, the pH may need to be adjusted at least one time during preparation of an aqueous antimicrobial composition, typically following the addition of the copper sulfate or silver sulfate and/or surfactant.

For larger scale production batches of copper sulfate containing antimicrobial compositions of the present invention, such compositions are prepared based on the percentages taught herein above of the elements required for preparation of such compositions. As a non-limiting example, such copper sulfate containing compositions can be prepared as follows: to produce 330 gallons of finished product, to an adequate-sized tank having circulation mixing, is about 2,116 pounds of 17 megohm water, typically, distilled water, about 183 pounds of a solubility enhancing aqueous composition, with continued mixing, about 183 pounds of 50% sodium hydroxide that is slowly added to the prior mixture, with continued mixing, about 590 pounds copper sulfate, with continued mixing to maintain the copper sulfate in solution, and about 2 pounds of 50% Glucopon® 420 UP, with continued mixing for at least about one hour. It is beneficial to adjust the pH after addition of each subsequent element beginning with the addition of the solubility enhancing aqueous composition. pH should be adjusted to be greater than 3.0 and, more typically, a pH in the range from about 4.0 to about 5.0 with a median of pH 4.5 being a reasonable target. Lowering the pH is accomplished by any reasonable means known to the skilled artisan but it is recommended to add an appropriate amount of a solubility enhancing aqueous composition or sulfuric acid; and increasing the pH can be accomplished by any means known to the skilled artisan but is recommended to add an appropriate amount of sodium hydroxide, particularly 50% sodium hydroxide.

For larger scale production batches of silver sulfate containing antimicrobial compositions of the present invention, such compositions are prepared based on the percentages taught herein above of the elements required for preparation of such compositions. As a non-limiting example, such silver sulfate containing compositions can be prepared as follows: to produce 330 gallons of finished product, to an adequate-sized tank having circulation mixing, is about 2,734.9 pounds of 17 megohm water, typically, distilled water, about 2.5 pounds of a solubility enhancing aqueous composition, with continued mixing, about 2.4 pounds of 50% sodium hydroxide that is slowly added to the prior mixture, with continued mixing, about 0.58 pounds silver sulfate, with continued mixing to maintain the silver sulfate in solution, and about 1.8 pounds of 50% Glucopon® 420 UP, with continued mixing for at least about one hour. It is beneficial to adjust the pH after addition of each subsequent element beginning with the addition of the solubility enhancing aqueous composition. pH should be adjusted to be greater than 3.0 and, more typically, a pH in the range from about 4.0 to about 5.0 with a median of pH 4.5 being a reasonable target. Lowering the pH is accomplished by any reasonable means known to the skilled artisan but it is recommended to add an appropriate amount of a solubility enhancing aqueous composition or sulfuric acid; and increasing the pH can be accomplished by any means known to the skilled artisan but is recommended to add an appropriate amount of sodium hydroxide, particularly 50% sodium hydroxide.

The intent and benefit of the present antimicrobial compositions is to provide an aqueous solution that is substantially free of solids. However, not all antimicrobial compositions will be free or substantially free of solids.

Although specific embodiments have been described above, these embodiments are not intended to limit the scope of the present disclosure, even where only a single embodiment is described with respect to a particular feature. Examples of features provided in this disclosure are intended to be illustrative rather than restrictive unless stated otherwise. The present disclosure is intended to cover such alternatives, modifications and/or equivalents as would be apparent to a person skilled in the art having the benefit of this disclosure.

It is to be understood that the present compositions are limited only to the ranges and or limitation set forth herein and not to variations within such ranges. It is also to be understood that the terminology used herein is for the purpose of describing particular embodiments only and is not intended to be limiting.

Further modifications and alternative embodiments of various aspects of the embodiments described in this disclosure will be apparent to the skilled artisan in view of the present disclosure. Elements and materials may be substituted for those illustrated and described herein, parts and processes may be reversed, and certain features of the embodiments may be utilized independently, all as would be apparent to one skilled in the art after having the benefit of the description. Changes may be made in the elements described herein without departing from the spirit and scope of the appended claims.

EXAMPLES

Example 1. Preparation of an ammonium sulfate stock solution for a solubility enhancing aqueous composition: Into a volumetrically calibrated common 250 mL beaker, 90 mL of deionized $H_2O$ was added. 20 grams of $(NH_4)_2SO_4$ was completely dissolved into the deionized water. The total volume was brought to 100 mL using additional deionized water. 20 grams $(NH_4)_2SO_4$ per 100 mL $H_2O$ is a 20% solution and is a 1.51 M solution.

Example 2. Preparation of a solubility enhancing aqueous composition:
 1.15 mL of 20% $(NH_4)_2SO_4$ was added to a common 10 mL polypropylene centrifuge tube
 8.0 mL deionized water added to tube
 0.850 mL of concentrated (95-98%) sulfuric acid ($H_2SO_4$) added to tube with sufficient force to mix Example 3. Alternative preparation of a solubility enhancing aqueous composition:
 0.576 mL of 20% $(NH_4)_2SO_4$ was added to a common 10 mL polypropylene centrifuge tube
 9.0 mL deionized water added to tube
 0.424 mL of concentrated (95-98%) sulfuric acid ($H_2SO_4$) added to tube with sufficient force to mix Example 4. Alternative preparation of a solubility enhancing aqueous composition:
 0.288 mL of 20% $(NH_4)_2SO_4$ was added to a common 10 mL polypropylene centrifuge tube
 9.5 mL deionized water added to tube
 0.212 mL of concentrated (95-98%) sulfuric acid ($H_2SO_4$) added to tube with sufficient force to mix Example 5. Preparation of solubility enhancing aqueous composition samples for liquid chromatography—mass spectrometry (LC-MS) analysis: Each of Examples 2, 3 and 4, following addition of the sulfuric acid:
 the centrifugation tubes were briefly capped and vortexed to mix thoroughly
 caps were loosened to vent. It was observed that the temperatures of the centrifugation tubes were greater than ambient temperature. Such temperature was not sufficient to melt the centrifugation tubes.
 reactions were allowed to run for about 60 minutes
 after completion of the reaction time, 1 mL samples of the reacted solutions were filtered through a 0.44 micro Pall syringe filter and placed into labeled mass spectrometry vials
 vials were loaded into a Thermo Q Exactive Plus MS system with a Vanquish LC front end
 LC Settings:
 0.25 ml/min
 40% methanol/60% water/0.1% formic acid
 column temp 30° C.

Thermo Accucore AQ C18 polar end cap column (150 mm×3 mm)
Injection volumes of 20 uL
Low resolution parameters
Full MS-SIM
0-10 minutes
Positive polarity
Resolution: 70,000
AGC Target: $3\times10^6$
Max IT: 200 ms
Scan Range: 50-700 mz
High resolution parameters
Full MS/dd-MS$^2$
0 -7 minutes
Positive polarity
Full MS: Resolution: 70,500
AGC Target: $3\times10^6$
Max IT: 100 ms
Scan range: 50-700 mz
dd-MS$^2$: Resolution: 17,500
AGC target: $2\times10^6$
Max IT: 50 ms
Scan range: 50-700 mz
Minimum AGC Target: $2\times10^3$ Example 6: Laboratory Preparations of Solubility Enhancing Aqueous Compositions for Ion Chromatographic Quantification:

A 24% solution of ammonium sulfate was created by adding 96 grams of ammonium sulfate to 400 grams deionized water. The solution was mixed to completely dissolve the ammonium sulfate.

Ten (10) identical 20 mL reactions were produced:
- 9.6 mL of the preceding 24% ammonium sulfate solution was added to individually labeled common 50 mL conical tubes by way of calibrated macropipette
- 10.4 mL of concentrated sulfuric acid (95-98% reagent grade) was added to each tube by way of calibrated micropipette with sufficient force to thoroughly mix
- Tubes were allowed to stand loosely capped for an hour for reaction to run to completion.

Example 7: Ion Chromatography (IC) Method.

Samples from Example 6 were transferred to IC vials, diluted appropriately (1:2500) to bring the ionic concentrations into the range of testing equipment used, and ion chromatography was undertaken using the following parameters:

Ion Chromatography:
Dual Thermo Dionex Aquion
Anion Side:
Column: Dionex IonPac AS22 RFIC 4×250 mm
Mobile phase: carbonate/bicarbonate buffet at 4.8/1.2mM
Flow: 1.2 mL/min isocratic
Suppressor: Dionex ADRS 600 4 mm
Sup. Voltage: 33 mA
Standard: IC STD for sulfate, 50-500 ppm
Anion cell: 35° C.
Anion column: 30° C.
18 minute run time
Cation Side:
Column: Dionex IonPac CS16 RFIC 5×250 mm
Mobile phase: 30 mM MSA solution
Flow: 1 mL/min isocratic
Suppressor: Dionex CDRS 600 4 mm
Sup voltage: 89 mA
Standard: IC STD for ammonium 20-100 ppm
Cation cell: 40° C.
Cation column: 35° C.
18 minute run time
All 25 uL injections Example 8. Ion Chromatography Results.

Using the sample preparations set forth in Example 6 and the ion chromatography methods set forth in Example 7, the following results (10 samples; 2 replicates) were obtained:

| Sulfate mol/L | Ammonium mol/L |
| --- | --- |
| 9.1904799 | 1.6264427 |
| 8.00-13.00 | 1.45-2.01 |

Example 9: Commercial-Scale Production of a Solubility Enhancing Composition

Into a 500-gallon polyethylene conical-bottom tank was added 160.5 pounds (about 19.2 gallons) of deionized water. Upon addition of the water, a magnetic-driven shearing pump with an impeller was engaged, circulating the water in the tank. To the water was slowly added 50.7 pounds of pre-weighed ammonium sulfate (GAC Chemical Corp., Searsport Me., U.S.A.) to enable solubilization of the ammonium sulfate preparing a 31.6% ammonium sulfate solution. The recirculating pump was allowed to run for about 20 minutes for this batch size. Complete solubilization of the ammonium sulfate was visually confirmed by decanting about 250 mL of solution into a PET bottle that was allowed to stand undisturbed for about 15 minutes, confirming complete solubilization.

A 50-gallon Dietrich (Corpus Christi, Tex., U.S.A.) closed-loop, stainless steel-jacketed, glass-lined reactor was pre-cooled using a CTS T-230 cooling tower (Cooling Tower Systems, Macon, Ga. U.S.A.) circulating a mixture of municipal water and sufficient sodium hypochlorite to maintain a pH from about 7.5 to about 7.8. To this reactor was added 400.6 pounds (about 26.1 gallons) of 98% sulfuric acid (Brenntag; Henderson, Ky. U.S.A.) while a shaft-driven paddle mixer was engaged at 1700 rpm. To the sulfuric acid was rapidly added the ammonium sulfate solution and was mixed for about 20 minutes (until the reaction mixture cooled to a temperature of about 130 degrees Fahrenheit) at which time the reaction to form this first solution was complete.

Example 10: Ion Chromatography Results.

Using the sample preparations set forth in Example 9 and the ion chromatography methods set forth in Example 7, the following results (averages of 3 replicates of 3 samples) were obtained:

| Sulfate mol/L | Ammonium mol/L |
| --- | --- |
| 10.77769681 | 1.677964718 |

Target Ranges:

| Sulfate mol/L | Ammonium mol/L |
| --- | --- |
| 8.00-13.00 | 1.45-2.01 |

Example 11. Commercial-Scale Preparation (330 gallons of finished product) of an Antimicrobial Composition:

To a 500 gallon polyethylene tank was added 2,116 pounds of 17 megohm water, with mixing via circulation from a roller pump;

To the water was added 183 pounds of a solubility enhancing aqueous composition, with continued mixing;

To the prior solution was slowly added 183 pounds of 50% sodium hydroxide, with continued mixing;

To the prior solution was added 590 pounds of copper sulfate, with continued mixing to maintain the copper sulfate in solution;

To the prior solution/suspension was added 2 pounds of Glucopon 420® with continued mixing for one hour pH of the final solution is adjusted to a pH of at least 3.0 and, more typically, a pH from about 4.0 to about 5.0 using additional solubility enhancing aqueous composition if the pH needs to be lowered or add sodium hydroxide if the pH needs to be increased to the target range.

Example 12: The following antimicrobial composition was used for the analysis in Example 13 and antimicrobial tests in Examples 14 and 15:

Solubility enhancing aqueous composition: 0.9% w/w
Dilute sodium hydroxide: 0.089% w/w
Glucopon (50%): 0.06% w/w
Silver sulfate: 0.022% w/w
Water: 98.93% w/w Example 13. Silver Quantification in an Antimicrobial Composition:

Test samples were produced, and atomic absorption was performed for the quantification of silver. Briefly, samples were diluted 10:1 and run on a calibrated Thermo iCE 3500 flame atomic absorption spectrometer. Silver was measured at 140 ppm for a stock solution and additional dilutions were made to 35 ppm and 17.5 ppm and all were used for antimicrobial testing.

Example 14. Antibacterial 10-Minute Contact Time Testing

Overnight cultures of *Staphylococcus aureus, Pseudomonas aeruginosa,* and *Salmonella enterica* were produced in nutrient broth at 37° C. with gentle shaking.

For testing, nutrient agar plates were warmed to room temperature. Bacteria were washed once with sterile Butterfield phosphate, gently pelletized with a benchtop centrifuge, and resuspended in Butterfield phosphate.

500 ul of test solution was added into 1.5 ml tubes. Butterfield phosphate was used as a control. 50 ul of washed bacteria was added to each tube. Tubes were incubated 10 minutes.

At 10 min, tubes were spun down a benchtop centrifuge to pellet bacteria. Bacteria were resuspended in 500 ul Butterfield phosphate. Serial dilutions were performed and plated onto nutrient agar plates. Plates were incubated overnight at 37° C.

All solutions produced greater than 5-log reductions in *S. aureus* at 10 minute contact times. The 35 ppm and 140 ppm dilutions showed greater than 5-log reductions in *P. aeruginosa* and *S. enterica* at 10 minute contact times.

Example 15. Antibacterial Residual Efficacy Testing

Further experiments explored the feasibility of using solutions as antibacterial surface treatments. Polystyrene (PS) petri dishes were used as test surfaces. Dishes were minimally swabbed with 140 ppm silver solution and allowed to dry overnight.

At 24 h post application, *S. aureus* and *P. aeruginosa* were swabbed into the plates. Control and test plates were allowed to fully dry (approx. 15 min).

1 mL of Butterfield phosphate was pipetted across the plate repeatedly to rinse the plates and collected. Serial dilutions were made in Butterfield phosphate and plated on nutrient agar plates. Plates were incubated overnight at 37° C.

*S. aureus* growth was reduced by greater than 3-log. *P. aeruginosa* growth was reduced between 1- and 2-log.

Example 16: Sample Antimicrobial Composition: To 950 mL of deionized water is added 0.9 mL of a solubility enhancing aqueous composition, 0.89 mL of a sodium hydroxide solution, 0.6 mL of Glucopon 420, and 0.22 g silver sulfate. Solution is stirred until the pH is stable. pH is adjusted to 4.5 using additional sodium hydroxide or sulfuric acid and the resultant solution is brought to 1000 mL total.

Example 17: Antiviral Activity on COVID-19 with Antimicrobial Compositions: Antimicrobial compositions of the present invention were tested for hard surface efficacy (1 and 6 hours) by Microbac Laboratories, Inc. (Sterling, Va. USA) for activity against SARS-CoV-2 (COVID-19 Virus Strain USA-WA1/2020 (source: BEI Resources, NR-52281).

Compositions used:
Water: 68.85%
Solubility Enhancing Aqueous Composition: 5.935%
Sodium Hydroxide: 5.96%
Glucopon: 0.07%
Copper Sulfate: 19.195%
Water: 3759.3 grams
Solubility Enhancing Aqueous Composition: 3.38 grams
50% Sodium Hydroxide: 3.4 grams
Glucopon: 2.5 grams
Silver Sulfate: 8.3 grams Experimental design was:
Host Cell Line: Vero E6 cells, ATCXC CRL-1585
Dilution Medium: Minimal Essential Medium (MEM)+ Newborn Calf Serum (NCS)
Neutralizer: MEM+10% NCS+0.5% Lecithin+1mM EDTA
Contact Time: 1 and 6 hours
Contact Temperature: Room Temperature (20+1° C., Actual 20° C.)
Relative Humidity: 48% RH
Number of Replicates: 1 replicate (4 wells per dilution)

According to the U.S. Environmental Protection Agency, the test substance passes the Virucidal Hard-Surface Efficacy Test of the product demonstrates a $\geq \log_{10}$ reduction on each surface in the presence or absence of cytotoxicity. When cytotoxicity is present, the virus control titer should be increased, if necessary, to demonstrate a $\geq \log_{10}$ reduction in viral titer on each surface beyond the cytotoxic level.

Results:
Antimicrobial Composition with copper sulfate—1 hour: passed
Antimicrobial Composition with copper sulfate—6 hours: passed
Antimicrobial Composition with silver sulfate—1 hour: passed
Antimicrobial Composition with silver sulfate—6 hours: passed Example 18: Further Explanation of Preparation of Test Compounds and Antimicrobial Activity:

Atomic Absorption, using the method described herein, was initially performed for the quantification of silver in several samples. All samples contained between 560 and 94 ppm.

Silver in sample Sample 1 was quantified at 140 ppm and was selected, in addition to additional dilutions as set forth herein, for further antibacterial testing.

Initial experiments with Sample 1 focused on antibacterial capabilities in solution. *Staphylococcus aureus, Pseudomo-* nas aeruginosa, and *Salmonella enterica* were all challenged with full strength or dilutions of sample Sample 1. Bacteria were cultured in nutrient broth overnight at 37° C. to ensure log phase growth at time of testing. Treatments of Sample 1, in which bacteria culture was added to Sample 1 solution prior to plating on nutrient agar overnight at 37° C., ranged from full strength (140 ppm) to 8-fold (17.5 ppm) for *S. aureus*, and to 4-fold (35 ppm) for *P. aeruginosa* and *S. enterica*. Initial testing with *S. aureus* used a 10-minute and 45-minute incubation of bacteria in Sample 1 solution and further testing with other bacteria used a 10-minute incubation only.

Treatment of *S. aureus* in Sample 1 solution for as little as 10 minutes eliminated all viable bacteria diluted down to the lowest (8-fold) dilution. The lowest dilution used against *P. aeruginosa* and *S. enterica* (4-fold) was also successfully prohibited all growth.

For the sake of clarity, the 8-fold dilution of silver is equivalent to 0.002529% of silver sulfate in a composition described in Example 12 and in antimicrobial compositions as otherwise described herein; and the 4-fold dilution of silver is equivalent to 0.005058% of silver sulfate in a composition described in Example 12 and in antimicrobial compositions as otherwise described herein.

Example 19: Antibacterial Pretreatment of Polystyrene:

Further experiments explored the feasibility of using Sample 1 as an antibacterial pretreatment of polystyrene (PS) to control bacterial colonization and growth. PS plates were coated with full strength Sample 1 solution and allowed to dry overnight before *S. aureus* and *P. aeruginosa* were swabbed into the plates. Control and test plates were allowed to fully dry (approx. 15 min) before Butterfield Phosphate (BPS) buffer was used to rinse the plates and collected for agar plating. Log dilutions were made in BPS and allowed to grow on nutrient agar overnight at 37° C.

PS pretreatment with Sample 1 reduced *S. aureus* growth by greater than 3-log. *P. aeruginosa* growth was reduced between 1- and 2-log, indicating that Sample 1 may reduce overall bacterial colonization and growth but is a more effective pretreatment against *S. aureus*.

We claim:

1. An antimicrobial composition comprising:
    a solubility enhancing aqueous composition comprising water; an anionic component comprising sulfate ions, alone or in combination with bisulfate ions, having a concentration from about 8.00 moles per liter to about 13.00 moles per liter of the aqueous solubility enhancing composition; a cationic component comprising ammonium ions having a concentration from about 1.45 moles per liter to about 2.01 moles per liter of the aqueous solubility enhancing composition; and hydrogen ions having a concentration from about 17.38 to about 21.68 moles per liter of the aqueous solubility enhancing composition, with the aqueous solubility enhancing composition having a concentration from about 0.81 percent to about 0.99 percent w/w of the antimicrobial composition;
    a dilute sodium hydroxide solution having a concentration of about 0.036 percent to about 0.099 percent w/w of the antimicrobial composition, wherein the concentration of sodium hydroxide is not greater than twenty percent in water to form the dilute sodium hydroxide solution;
    an additive selected from the group consisting of an anionic surfactant and a non-ionic surfactant, such additive having a concentration from about 0.054 percent to about 0.066 percent w/w of the antimicrobial composition;
    silver sulfate having a concentration from about 0.00228 percent to about 0.00557 percent w/w of the antimicrobial composition; and
    water having a mass of at least 66.67 times the mass of the silver sulfate used in the antimicrobial composition.

2. An antimicrobial composition of claim 1, wherein the composition further comprises the addition of one of the group consisting of an acid and a base to adjust the pH of the composition to a pH in the range from about 3.0 to about 5.0.

3. An antimicrobial composition of claim 2, when the adjusted pH is 4.5.

4. A method of inhibiting microorganisms comprising applying at least one antimicrobial composition of claim 1 to at least one of the group consisting of said microorganisms and a surface on which said microorganisms reside or could reside.

5. A method of claim 4, wherein the inhibition of the microorganisms is for a period lasting at least 6 hours.

6. A method of claim 4, wherein the inhibition of the microorganisms is for a period lasting at least 24 hours.

7. Antimicrobial surfaces comprising at least one surface to which at least one antimicrobial composition of claim 1 has been applied.

8. An antimicrobial composition of claim 1, wherein the nonionic surfactant is an alkyl polyglucocides surfactant.

9. A method of inhibiting microorganisms comprising applying at least one antimicrobial composition of claim 8 to at least one of the group consisting of said microorganisms and a surface on which said microorganisms reside or could reside.

10. A method of inhibiting microorganisms of claim 4, wherein the surface on which said microorganisms reside or could reside do not include foodstuff.

11. A method of inhibiting microorganisms of claim 8, wherein the surface on which said microorganisms reside or could reside do not include foodstuff.

12. A method of claim 4, wherein the surface to which said composition is applied does not turn black.

13. A method of claim 4, wherein the surface to which said composition is applied maintains its original color.

14. A method of claim 8, wherein the surface to which said composition is applied does not turn black.

15. A method of claim 8, wherein the surface to which said composition is applied maintains its original color.

* * * * *